(12) United States Patent
Yamada et al.

(10) Patent No.: US 10,101,094 B2
(45) Date of Patent: Oct. 16, 2018

(54) HEAT RECEIVING TILE FORMED OF CARBON FIBER COMPOSITE MATERIAL AND METHOD OF MANUFACTURING THE SAME

(71) Applicant: KAWASAKI JUKOGYO KABUSHIKI KAISHA, Kobe-shi, Hyogo (JP)

(72) Inventors: Hirokazu Yamada, Naka-gun (JP); Yuuichirou Mori, Amagasaki (JP); Kouji Satou, Amagasaki (JP); Kiyotaka Matsunami, Amagasaki (JP); Yasutaka Maeda, Hikone (JP); Tamotsu Nakae, Shiga (JP); Makoto Kubota, Hikone (JP); Shinji Sakurai, Naka (JP); Shigetoshi Nakamura, Naka (JP); Hidetsugu Ozaki, Naka (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 529 days.

(21) Appl. No.: 14/891,623

(22) PCT Filed: May 14, 2014

(86) PCT No.: PCT/JP2014/062891
§ 371 (c)(1),
(2) Date: Nov. 16, 2015

(87) PCT Pub. No.: WO2014/185476
PCT Pub. Date: Nov. 20, 2014

(65) Prior Publication Data
US 2016/0116227 A1    Apr. 28, 2016

(30) Foreign Application Priority Data

May 16, 2013 (JP) .................................. 2013-103614

(51) Int. Cl.
*B23K 1/00* (2006.01)
*F28D 20/00* (2006.01)
(Continued)

(52) U.S. Cl.
CPC ........ *F28D 20/0056* (2013.01); *B23K 1/0008* (2013.01); *B23K 1/19* (2013.01);
(Continued)

(58) Field of Classification Search
CPC .... B23K 1/0008; B23K 1/19; B23K 35/0222; B23K 35/0238; B23K 35/025;
(Continued)

(56) References Cited

U.S. PATENT DOCUMENTS 5,580,670 A    12/1996 Grill et al.
2007/0137847 A1    6/2007 Schedler et al.
(Continued)

FOREIGN PATENT DOCUMENTS

JP    H07-167972 A    7/1995
JP    H08-506315 A    7/1996
(Continued)

OTHER PUBLICATIONS

Jul. 29, 2014 International Search Report issued in International Patent Application No. PCT/JP2014/062891.
(Continued)

*Primary Examiner* — Elizabeth E Mulvaney
(74) *Attorney, Agent, or Firm* — Oliff PLC

(57) ABSTRACT

A heat receiving block formed of carbon material having a through hole; a cooling tube formed of copper alloy fitted in the through hole of the heat receiving block; cylindrical material of interlayer disposed between the heat receiving block and the cooling tube; and brazing material layers inserted between the material of interlayer and the heat receiving block and between the material of interlayer and
(Continued)

the cooling tube, also a slit which penetrates the heat receiving block and the material of interlayer over thickness of the heat receiving block and reaches the cooling tube on the back side of the heat receiving surface. It can provide heat receiving tile formed of carbon fiber composite material for high heat flux component such as a first wall of nuclear fusion reactor, which is produced by metallurgically joining carbon material with copper alloy and has higher cooling efficiency than conventional heat receiving tiles.

12 Claims, 6 Drawing Sheets

(51) Int. Cl.
G21B 1/13 (2006.01)
B23K 35/30 (2006.01)
B23K 35/02 (2006.01)
B23K 1/19 (2006.01)
B23K 35/24 (2006.01)
C21D 1/18 (2006.01)
C22F 1/08 (2006.01)
C22F 1/18 (2006.01)
B23K 103/12 (2006.01)
B23K 103/14 (2006.01)
B23K 103/16 (2006.01)

(52) U.S. Cl.
CPC ........ *B23K 35/025* (2013.01); *B23K 35/0222* (2013.01); *B23K 35/0238* (2013.01); *B23K 35/0244* (2013.01); *B23K 35/0255* (2013.01); *B23K 35/24* (2013.01); *B23K 35/30* (2013.01); *B23K 35/302* (2013.01); *C21D 1/18* (2013.01); *C22F 1/08* (2013.01); *C22F 1/183* (2013.01); *G21B 1/13* (2013.01); *B23K 2203/12* (2013.01); *B23K 2203/14* (2013.01); *B23K 2203/16* (2013.01); *Y02E 30/128* (2013.01)

(58) Field of Classification Search
CPC .... B23K 35/0255; B23K 35/24; B23K 35/30; B23K 2203/12; B23K 2203/14; B23K 2203/16; C21D 1/18; C22F 1/08; C22F 1/13; F28D 20/0056
See application file for complete search history.

(56) References Cited

U.S. PATENT DOCUMENTS

2008/0032530 A1  2/2008  Friedrich et al.
2011/0132973 A1  6/2011  Uchiyama et al.

FOREIGN PATENT DOCUMENTS

JP    2007-155737 A    6/2007
JP    2009-192264 A    8/2009
JP    2011-122883 A    6/2011

OTHER PUBLICATIONS

Nov. 17, 2015 International Preliminary Report on Patentability issued in International Patent Application No. PCT/JP2014/062891.

HEAT RECEIVING TILE FORMED OF CARBON FIBER COMPOSITE MATERIAL AND METHOD OF MANUFACTURING THE SAME

TECHNICAL FIELD

The present invention relates to a heat receiving tile formed of a carbon fiber composite material used heat receiving equipment for high heat flux panel such as a first wall of a nuclear fusion reactor which faces high temperature plasma or the like, and a method of manufacturing the same.

BACKGROUND ART

A plasma facing component provided in a nuclear fusion reactor refers in general to equipment directly opposed to plasma, includes a divertor, a blanket surface, a limiter or the like, and receives severe heat and particle load from high temperature plasma. The first wall is required to maintain structural integrity and serve as a shield against plasma for the surrounding structure without causing negative effects to the plasma.

Therefore, the plasma facing component is required to have a function to well endure such a high heat load and remove the heat. In order to achieve the function of the first wall required for removing the heat of the high heat load, it is necessary to prepare the heat receiving equipment of the plasma facing component by using a material having an excellent heat conductivity.

FIG. 8 is a sectional view illustrating one example of heat receiving tile which is used in a divertor of a nuclear fusion reactor.

Especially the divertor of the Tokamak type nuclear fusion reactor receives the highest heat load among the equipment provided in a nuclear fusion reactor because the kinetic energy of the charged particles coming into the divertor is applied thereto as heat. Therefore, the divertor is required to have a function for well enduring such a high heat load and removing the heat.

For protecting a cooling structure from a sputtering due to ion radiation or a heat impact caused by plasma disruption, the divertor is provided with a heat receiving block formed of a material, which has less negative effect against the plasma, on its surface facing the plasma.

The heat receiving block is preferably formed of a certain material having a low atomic number which as less negative effect against the plasma, especially a carbon fiber reinforced carbon composite material (CFC material) which is a carbon-based material having higher heat conductivity. This is because particles are generated from the surface of the heat receiving block and scattered into the plasma by the effect of the sputtering or the like, leading to temperature drop of the plasma and degradation of confinement properties of the plasma.

Further, this heat receiving block has a cooling tube provided therein to achieve the function of the divertor required for removing the heat of the high heat load.

In the nuclear fusion reactor, which is designed for performing a long-term operation, the surface temperature of a component constituting the divertor tends to exceed the melting point thereof due to the thermal flow going beyond the limits of the heat capacity of the materials. Therefore, a forced cooling approach has been employed for cooling the heat receiving block with the cooling tube formed of a copper alloy, such as chromium-zirconium copper (CuCrZr) or the like, exhibiting high heat conductivity and strength, and the heat received by the heat receiving block is forcibly removed by a coolant such as water or the like flowed through the cooling tube.

However, the heat receiving block formed of a carbon material such as CFC or the like has a poor ability of joining to the cooling tube formed of a CuCrZr copper alloy, and there is a great difference in the thermal expansion coefficient between the heat receiving block and the cooling tube.

Therefore, for conducting the heat energy received from the plasma to the cooling tube and for absorbing the difference in the thermal expansion coefficient efficiently, it is preferred to reduce the thermal resistance as much as possible by providing a material of interlayer formed of a copper material such as CuW or the like between the heat receiving block and the cooling tube and by metallurgically joining these materials such as by brazing or the like, using a joining material mainly containing Cu—Mg and Ti—Cu based material having an excellent heat conductivity.

However, the thermal expansion coefficients greatly differ from one another as follows: $2 \times 10^{-6}$ for the heat receiving block; $2 \times 10^{-5}$ for the cooling tube; and $1 \times 10^{-6}$ for the material of interlayer. Therefore, defects tend to occur at joining parts during the high temperature treatment in the brazing process, especially when the cooling tube is shrinking due to temperature drop, and the material of interlayer and the heat receiving block arranged outside the cooling tube cannot follow the shrinkage of the cooling tube arranged inside. For this reason, the heat receiving block tends to be cracked, or peeling between the heat receiving block and the material of interlayer tends to occur, thereby leading to reduction in heat transfer coefficient and cooling efficiency.

Patent Document 1 discloses a high heat resistant structural component in which a graphite part and a metallic part are bonded to each other via a brazing layer, and an intermediate layer is provided between the metallic part and the brazing layer. The provision of this special intermediate layer is intended to absorb the difference in the thermal expansion coefficient between dissimilar materials, thereby firmly bonding the graphite and the metal with each other.

It is true that the high heat resistant structural component disclosed in the Patent Document 1 can endure a heat cycle load that the component will undergo during the operation of the nuclear fusion reactor. Thus, occurrence of undue deformation or cracks in this component can be prevented. However, due to the brazing at temperature between 850 and 1900° C., a high temperature process required for producing such a component tends to damage the component, thus degrading the production yield.

Various problems were found out from our study on test samples each including a cooling tube formed of a copper alloy, a heat receiving block formed of CFC material, and a cylindrical material of interlayer formed of oxygen free copper and inserted between the cooling tube and the heat receiving block. For instance, from an aging treatment at 480° C. on the test sample after it was subjected to vacuum brazing at 985° C. and then rapidly quenched to maintain the strength of the precipitation-hardening type copper alloy, we found at a considerably high frequency that the part of the heat receiving block in contact with the material of interlayer has been cracked in the axial direction, as well as found defects caused by the failure in brazing.

As such, the conventional heat receiving tile requires further improvement in the cooling function.

RELATED ART DOCUMENT

Patent Document

Patent Document 1: Japanese Patent Application Publication JP8-506315T

SUMMARY OF INVENTION

Problem to be Solved by the Invention

The present invention has been made in order to provide a heat receiving tile, which is used for high heat flux component, such as a divertor of a plasma facing component provided in a nuclear fusion reactor, and formed by metallurgically joining a carbon material with a copper alloy, having higher cooling efficiency than a conventional heat receiving tile, and the method for manufacturing the same.

Means for Solving the Problems

High heat load heat receiving equipment of the present invention, especially a heat receiving tile used for a first wall of a nuclear fusion reactor (such as a divertor or the like) is a heat receiving tile including a heat receiving block formed of a carbon material and provided with a through hole, a cooling tube formed of a copper alloy and fitted in the through hole of the heat receiving block, a cylindrical material of interlayer disposed between the heat receiving block and the cooling tube, and brazing layers inserted between the material of interlayer and the heat receiving block and between the material of interlayer and the cooling tube, and characterized by a slit on the back side of the plasma facing surface which is formed over the thickness of the heat receiving block and penetrates through the heat receiving block and the material of interlayer so as to reach the cooling tube.

The conventional heat receiving tile provided with a circular cooling tube and a material of interlayer fitted in a through hole of the heat receiving block has a problem that defects occur especially in the boundary area between the heat receiving block and the material of interlayer. This is because the heat receiving block has poor joining ability to the material of interlayer and great stress is generated in the radial direction due to high heat treatment, which is caused by a difference in the coefficients of thermal expansion between these materials.

However, the material of interlayer of this invention can easily deform and absorb the stress irrespective of a great difference in the thermal expansion coefficient between the cooling tube and the material of interlayer due to high heat treatment during the manufacturing process. This is because the heat receiving tile of this invention has a slit formed in a broken-ring shape on the cylindrical material of interlayer. Further, although there is a great difference in thermal expansion coefficient between the material of interlayer and the heat receiving block, the material of interlayer is easily displaced in the circumferential direction and the stress in the radial direction is released, so that peeling between the material of interlayer and the heat receiving block and cracks within the heat receiving block which tend to suppress heat transfer, are less likely to occur, improving heat transfer from the heat receiving block to the coolant flowing through the cooling tube.

The width of the slit of the material of interlayer needs to be set such that both circumferential ends of the material of interlayer do not contact with each other when shrinking during the cooling process. For example, when the outer diameter of the cooling tube is 15 mm, it should be 0.1 mm. The slit width does not need to be larger than the cooling tube and can be chosen within a range of 2 to 8 mm which is capable of being easily machined. The slit of the material of interlayer does not need to be as wide as the slit of the heat receiving block.

Moreover, thin film type of brazing filler metal inserted between the material of interlayer of the heat receiving tile and the heat receiving block and also between the material of interlayer and the cooling tube have a melting point of, for example, approximately 920° C. The thin film type of brazing filler metal has high tensile force until just before being subjected to vacuum brazing in a high temperature condition at, for example, approximately 985° C. Therefore, an existence of a thin film type of brazing filler metal over the slit of the material of interlayer in the assembly before brazing suppresses the deformation of the material of interlayer until just before vacuum brazing so that the stress generated in the boundary area between the material of interlayer and the heat receiving block is not sufficiently released.

Accordingly, for further improvement of heat transfer performance of the heat receiving tile, the thin film type of brazing filler metal forming a brazing sheet between the heat receiving block and the material of interlayer is preferably open at the slit or arranged in such a manner that each end of the thin film type of brazing filler metal comes at each end of the slit so as to be discontinuous.

The void of the thin film type of brazing filler metal at the slit allows the material of interlayer to deform freely during vacuum brazing so as to release the stress.

A titanium-carbide layer is preferably formed on the inner wall of the through hole of the heat receiving block. Copper contained in the brazing filler metal impregnates the fiber gap of the titanium-carbide layer formed on the surface of a carbon material, thereby firmly joining the heat receiving block and the brazing layer with each other.

Moreover, the present invention is a method of manufacturing a heat receiving tile used for high heat flux component, especially a plasma facing component of a nuclear fusion reactor (such as a divertor), including the steps of: disposing a first thin film type of brazing filler metal on an inner surface of a through hole of a heat receiving block which has a slit on a back of its heat receiving face; disposing a cylindrical material of interlayer, which has a single slit, inside of the first thin film type of brazing filler metal while placing the slit of the cylindrical material of interlayer at a same position as a slit of the heat receiving block; disposing a second thin film type of brazing filler metal on an inner surface of the material of interlayer; disposing a cooling tube inside of the second thin film type of brazing filler metal, so as to prepare an assembly thereof; and subjecting the assembly to a vacuum brazing process and further to an aging treatment process.

Further, the first brazing film is preferably discontinuous at the slit of the material of interlayer, for example, by being wrapped around the cylindrical material of interlayer in such a manner that each end of the first thin film type of brazing filler metal comes at the slit of the cylindrical material of interlayer. The first thin film type of brazing filler metal partitioned at the position of the slit does not restrain the deformation of the material of interlayer during manufacturing process, as a result, occurrence of defects in the boundary area can be suppressed.

A titanium thin film layer is preferably formed on the inner surface of the through circular hole of the heat receiving block. The titanium thin film layer can be easily formed by, for example, a known vapor deposition method. Titanium contained in the titanium thin film layer reacts with carbon contained in a carbon material in the high-temperature condition so as to form a uniform titanium-carbide layer on the carbon material surface, thereby firmly joining a carbon material and a brazing material with each other.

Advantageous Effect of the Invention

The heat receiving tile of the present invention can provide high heat flux component, for example, a divertor of a nuclear fusion reactor having higher heat removal efficiency than the conventional heat receiving tile.

EMBODIMENT OF THE INVENTION

Hereinafter, high heat flux component, particularly a heat receiving tile used for a divertor of a nuclear fusion reactor and a manufacturing method thereof according to the present invention will be described in detail with respect to an embodiment. The present embodiment relates to a heat receiving tile used for the divertor of the Tokamak type nuclear fusion reactor. However, it is obvious that this invention can be widely applied to not only the plasma facing part of the blanket and the limiter of a nuclear fusion reactor but also a heat receiving tile formed by metallurgically joining a heat receiving block formed of a carbon material with a cooling tube formed of a copper alloy.

Figure 1:
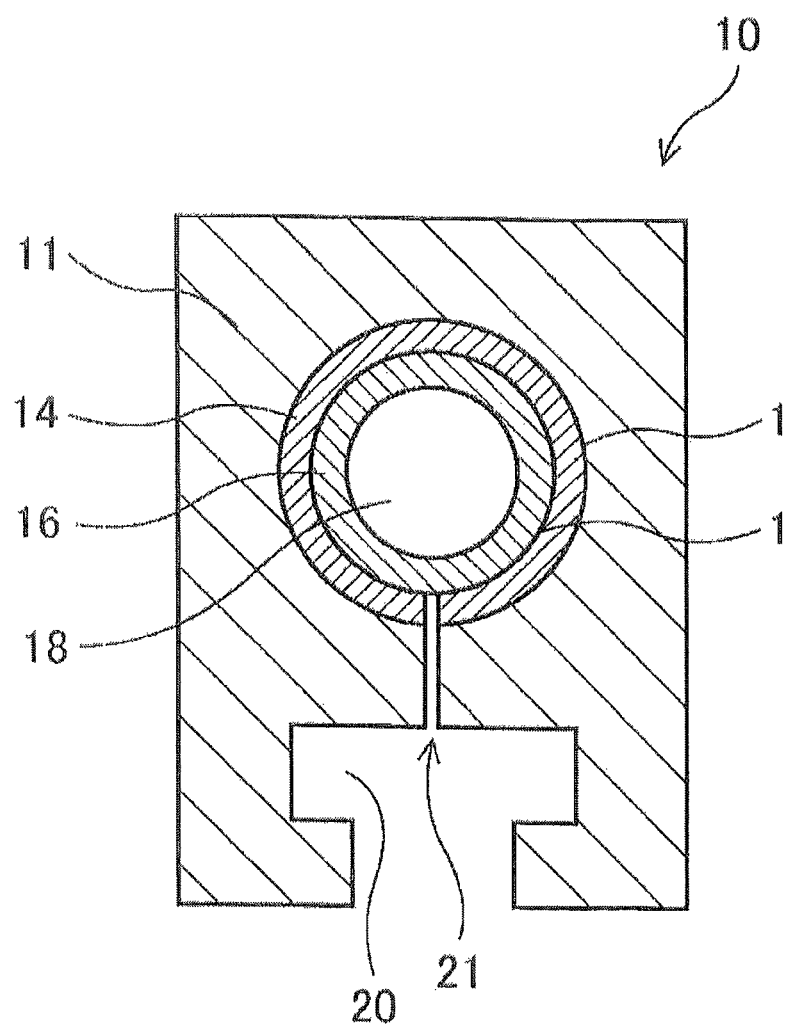
FIG. 1 is a sectional view of a heat receiving tile formed of a carbon fiber composite material used for high heat flux component such as a divertor of a nuclear fusion reactor and the like according to a first embodiment of the present invention.

As shown in FIG. 1, the heat receiving tile 10 of this embodiment is provided with the heat receiving block 11 having a mono-block structure and formed of a carbon fiber reinforced composite material (CFC) and the cooling tube 16 formed of a copper alloy, such as chromium-zirconium copper (CuCrZr) or the like.

The heat receiving block 11 is a prismatic body having rectangular or square faces and the heat receiving surface is a rectangular or square shape with one side of approximately 20 to 30 mm. A through hole 12 with a diameter of approximately 15 to 20 mm, through which the cooling tube 16 passes, is formed at the position in the heat receiving block 11 where the distance from the side surface is substantially equal to the distance from the heat receiving surface. On the opposite side to the heat receiving surface across the through hole 12, the fitting groove 20 through which a rail is passed for fixing the heat receiving tile to other equipment, and the slit 21 which connects the through hole 12 with the fitting groove 20 are formed. A titanium-carbide layer may be formed on the inner wall surface around the through hole 12.

The cooling tube 16 extends through the through hole 12 of the heat receiving block 11. This cooling tube 16 has a wall thickness of approximately 1.5 mm and is formed of the copper alloy of a relatively high heat transfer coefficient. In this case, the cooling tube 16 is provided for removing the heat received by the receiving tile 10 by using a coolant such as water or the like flowed through the cooling tube 16. Preferably, the cooling tube 16 is formed of the chromium-zirconium copper (CuCrZr) having a relatively high heat transfer coefficient. Heat transfer performance can be improved by providing screws to the inner wall of the cooling tube 16 so as to increase the heat transfer area.

A cylindrical material of interlayer 14 is inserted between the heat receiving block 11 and the cooling tube 16. The cylindrical material of interlayer 14 is formed of copper alloy such as the oxygen free copper or copper tungsten (CuW) and serves to absorb the difference in the coefficient of thermal expansion between the heat receiving block 11 and the cooling tube 16. The cylindrical material of interlayer 14 has the slit 23 opened by cutting the material of interlayer in the longitudinal direction at one place and arranged such that the slit 23 thereof is at the same position as the slit 21 of the heat receiving block 11.

The first thin film type of brazing filler metal 13 is inserted between the heat receiving block 11 and the material of interlayer 14 and the second thin film type of brazing filler metal 15 is inserted between the material of interlayer 14 and the cooling tube 16, and they are joined and fixed together respectively by vacuum brazing. Preferably, the brazing films 13 and 15 are formed of Cu—Mg or Ti—Cu based materials having an excellent heat conductivity. Further, each of the brazing films 13, 15 is cut from a sheet formed of a brazing filler metal having a composition of, for example, 60Ti-15Cu-25Ni, a thickness of approximately 50 μm and a width fitted for the length of the through hole 12, so as to be prepared as a ribbon like sheet and then to be cut into appropriate length.

Figure 2:
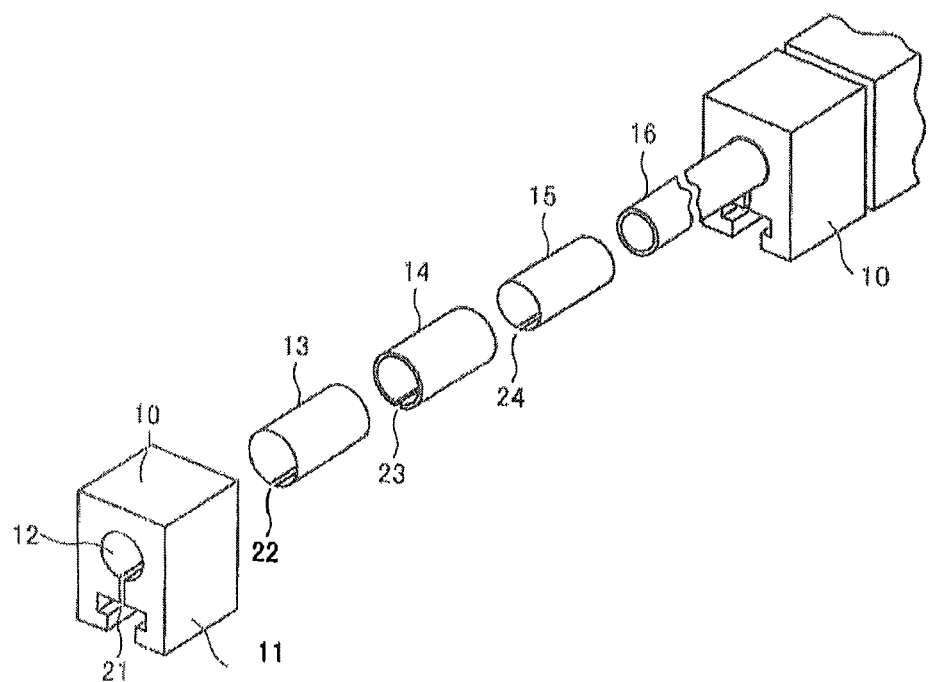
FIG. 2 is an exploded perspective view illustrating a method of assembling the heat receiving tile of the present embodiment.
Figure 3:
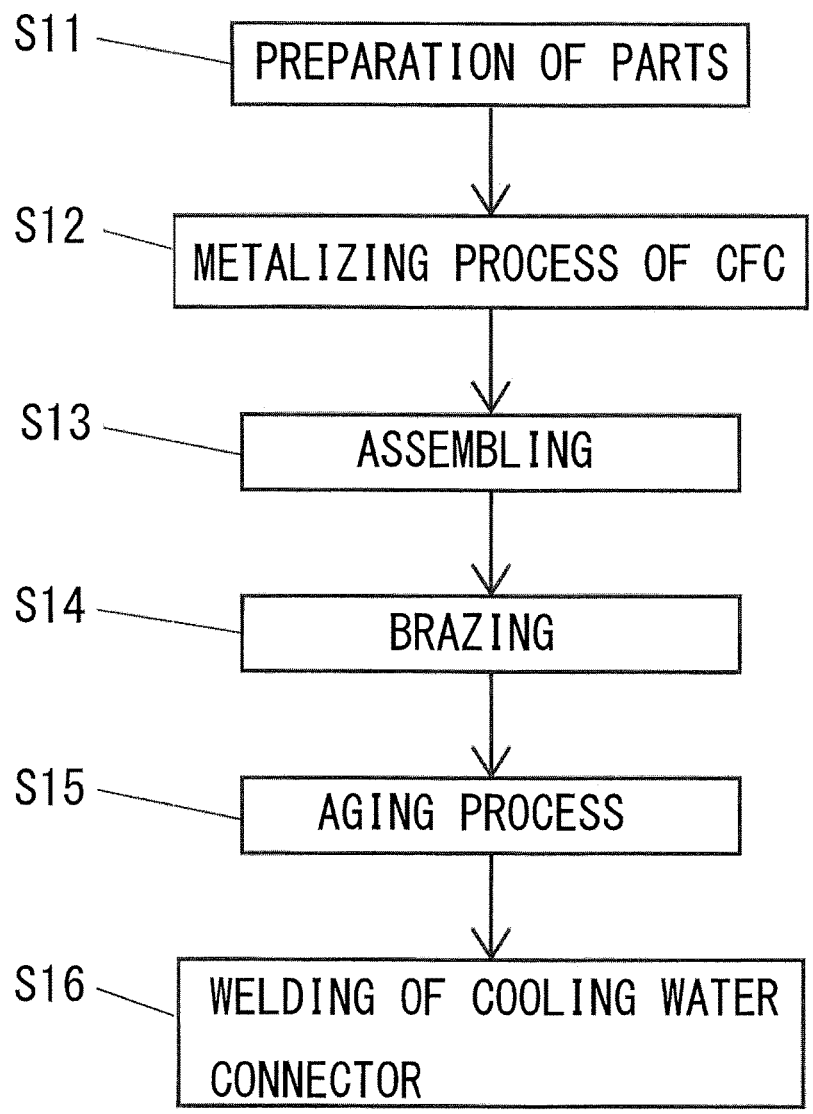
FIG. 3 is a flowchart illustrating a manufacturing procedure of the heat receiving tile of the present embodiment.

Next, the procedure for producing the heat receiving tile in this embodiment will be described with reference to FIG. 2 and FIG. 3.

First of all, the heat receiving block 11, the cooling tube 16, the material of interlayer 14, the thin film type of brazing filler metal 13, 15 and the like are respectively prepared (S11).

The heat receiving block 11 formed of CFC is subjected to sufficient vacuum degassing, for example, by being heated to approximately 1000° C. within a vacuum heating furnace so as not to discharge impurities into an inside of a nuclear fusion reactor. Regarding the copper or copper alloy, only degreasing is performed to prevent the copper or copper alloy from deforming due to a high heat treatment.

After the heat receiving block 11 has been subjected to a degassing process, the inner wall of the through hole 12 is metalized so as to form a metal layer (S12).

The metal layer is formed by applying a paste or solution obtained by mixing metal powder containing copper and titanium with a neutral binder, and then sintering the same in a vacuum heating furnace so as to form the metal layer. The metal layer is further machined so as to form a smooth cylindrical surface thereby enabling the material of interlayer 14 to be inserted therein.

The surface of the inner wall of the through hole 12 may be metalized by forming a titanium thin layer by the vapor deposition of titanium, such as the ion vapor deposition or the like.

The material of interlayer 14 with the second thin film type of brazing filler metal 15 wound and attached around the inside of the material of interlayer 14 is fitted around the cooling tube 16 while the position of the slit 23 is set at the position of the slit of the heat receiving tile 10 which has already been fixed around the cooling tube 16 in the previous process. At this time, the fixing positions of the heat receiving tile 10 into which the cooling tube 16 has already been inserted and the heat receiving tile 10 into which the cooling tube 16 is to be inserted are determined so as to make the gap therebetween approximately 0.5 to 1.0 mm.

Further, the first thin film type of brazing filler metal 13 is disposed on the inner surface of the through hole 12 of the heat receiving block 11, the heat receiving block 11 is fitted and positioned around the material of interlayer 14, and the heat receiving block 11 which has already been inserted and the heat receiving block 11 which is to be inserted are positioned so that they have the same posture. By this positioning, the slit 21 of the heat receiving block 11 and the slit 23 of the material of interlayer 14 form a slit extends from the outer surface opposed to the heat receiving surface to the outer surface of the cooling tube 16. This process is repeated a required number of times, thereby preparing the assembly prior to the brazing process which has a predetermined number of heat receiving tiles 10 which are interconnected together (S13).

In order to securely maintain the space between the heat receiving tiles 10 in the assembly during a following process, a spacer formed of a carbon material may be used. In this case, the spacer is removed after the fixing process by brazing.

The thin film type of brazing filler metal 13, 15 may be inserted into the gaps after the material of interlayer 14 and the heat receiving block 11 are assembled together. The thin film type of brazing filler metal 13, 15 are preferably wound in such manner that the joints 22 and 24 meet the slit 21 of the heat receiving block 11 and the slit 23 of the material of interlayer 14. Preferably, the thin film type of brazing filler metal 13, 15 do not overlap with each other on the joints 22 and 24 by making the circumferential length shorter or by leaving both ends of the thin film type of brazing filler metal idle free from each other within the slit. The first thin film type of brazing filler metal 13 may be wound so as to extend over the slit 23, and then be cut along the slit 23 prior to the vacuum brazing.

Then, so-obtained assembly is subjected to the vacuum brazing treatment by heating and melting the brazing filler metals 13, 15 in a vacuum heating furnace at a temperature equal to or higher than 925° C., e.g., approximately 1000° C. (S14).

In order to make the entire body of the assembly, which has such a complex shape and composition as described above, at an equal brazing temperature, the assembly is preferably subjected to sufficient preheating provided at a temperature slightly lower than the brazing temperature before the temperature reaches the brazing temperature. The assembly is forcibly cooled with inert gas such as argon gas or nitrogen gas and the like after further heating the uniformly heated assembly to the brazing temperature and holding the assembly at the brazing temperature for the predetermined time.

When the metal material constituting the cooling tube 16 is the precipitation hardening copper alloy (CuCrZr), this material is softened if it is subjected to the brazing process. Accordingly, such a material should be subjected to an appropriate aging after being subjected to the brazing process and the solution treatment at the same time in order to ensure the hardness thereof. Therefore, such a joined body of the cooling tube/heat receiving blocks, which has been made by interconnecting and brazing an appropriate number of heat receiving tiles, is subjected to the aging process for a predetermined time at a suitable aging temperature of approximately 500° C. in a vacuum (S15).

After such an aging process, the assembly is allowed to be cooled in the furnace.

The connectors for cooling tube are attached by welding to each end of the cooling tube 16 of the joined body composed of the brazed cooling tube/heat receiving blocks (S16).

In this case, the connectors for cooling tube are formed of stainless steel which has less joining ability with respect to the cooling tube formed of CuCrZr alloy. Therefore, such connectors are attached to one another by electron beam welding using the insert tube formed of a nickel based alloy such as Inconel and the like as an insert material. After the welding process, the insert tube is finished in a predetermined dimensions by machining the inner and outer surfaces of the insert tube.

Note that, when titanium is contained in the inner wall surface layer of the heat receiving block 11, the titanium can produce a titanium compound, such as titanium carbide or the like, by reacting with carbon components contained in the heat receiving block 11 so as to be firmly joined with the heat receiving block 11.

For the heat receiving tile 10 manufactured in this way, the cylindrical material of interlayer 14 has the slit 23 to form an open-ring shape so that even when the diameter of the cooling tube 16 decreases greatly during a cooling period after the brazing process, the material of interlayer 14 joined to the outer periphery of the cooling tube 16 can deform following the deformation of the cooling tube 16 and absorb the difference in the thermal expansion coefficient as a circumferential displacement, as a result, occurrence of defects is suppressed.

Moreover, there is a great difference in the thermal expansion coefficient between the material of interlayer 14 and the heat receiving block 11, which are metallurgically joined to each other. However, the inner wall surface of the through hole 12 is displaced in the radial direction following the displacement of the outer periphery of the material of interlayer 14 because of the slit 21 of the through hole 12 provided in the heat receiving block 11. Therefore, the occurrence of the peeling in the boundary area as well as the occurrence of the cracks in the heat receiving block 11 adjacent to the boundary are decreased compared with the conventional heat receiving tile.

Accordingly, the heat receiving tile 10 of this embodiment has a higher heat conductivity so that the heat received by the heat receiving block 11 can be transferred to the cooling tube 16 and removed more efficiently.

Note that, the first thin film type of brazing filler metal 13 inserted between the material of interlayer 14 and the heat receiving block 11 is formed of a high rigidity alloy, such as 60Ti-15Cu-25Ni. Therefore, when the first thin film type of brazing filler metal 13 is wound so as to extend over the slit 23 of the material of interlayer 14, the first thin film type of brazing filler metal 13 prevents the material of interlayer 14 from deforming freely until the brazing material melts. Even if the brazing temperature exceeds the melting point of a brazing filler metal, when curing is performed insufficiently, defects, which prevent heat transfer, may occur in the brazing area. Accordingly, the first thin film type of brazing filler metal 13 is preferably cut at the slit 23 of the material of interlayer 14 before the brazing process.

The heat removal effect of the heat receiving tile 10 of this embodiment has been confirmed by using test samples.

Figure 4:
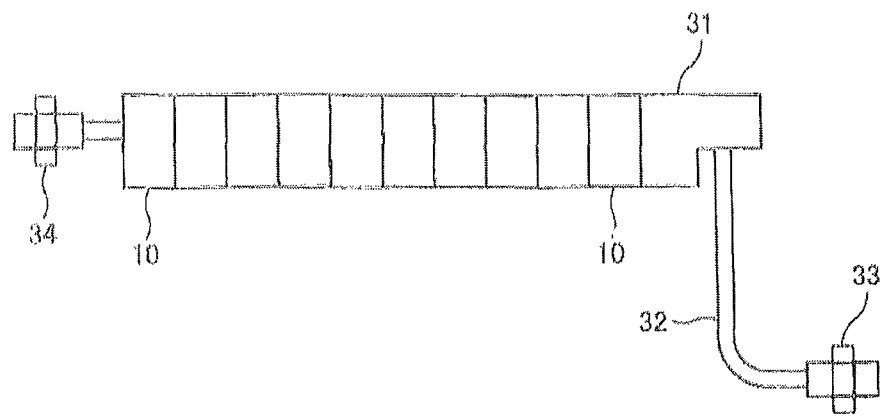
FIG. 4 is a side view of a test sample of the heat receiving tile of the present embodiment.

FIG. 4 illustrates the test sample used to evaluate the heat removal effect of the heat receiving tile 10 of this embodiment.

In the test sample, tens of the heat receiving tiles 10 are connected to one another, a cooling tube extending through a series of the heat receiving tiles 10 is connected at its one end directly to a cooling water pipe 32 and at its other end via a cooling passage part 31 to the cooling water pipe 32, and connectors 33, 34 for cooling tube are attached to each end of the cooling water pipe 32. The cooling water pipe 32 is connected to a water source and a draining device for the test.

A plurality of prepared samples were constituted by the combination of one CFC heat receiving block selected from the CFC heat receiving blocks each having a slit with a width of 4 mm or 8 mm and a CuW material of interlayer selected from the three CuW material of interlayers each having a slit with a width of 2 mm, 6 mm or 8 mm.

Each sample had two variations: one having a thin film type of brazing filler metal disposed so as to extend over the slit (without a slit) and heated to the brazing temperature, and the other having a thin film type of brazing filler metal disposed so as not to cover the slit and brazed (with a slit).

Note that, in order to compare with a conventional technology, another sample of the current heat receiving tiles without any slit in either the heat receiving block or the material of interlayer was also prepared.

The heat removal effect of the heat receiving tile was evaluated by measuring the time taken for the surface temperature of the heat receiving tile to drop from 90° C. to 60° C., by the method in which the heat receiving tile was held at approximately 95° C. by supplying boiling water to the cooling water passage 32 of the test sample, and then the quick switching from boiling water to cold water of 5° C. was performed. The heat transfer coefficient and the cooling effect become higher as the temperature drop time becomes shorter.

Figure 5:
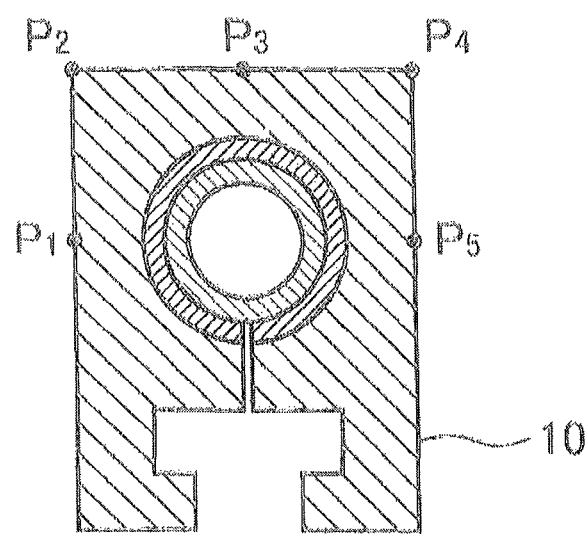
FIG. 5 is a drawing illustrating temperature measuring points in the test of the heat receiving tile of the present embodiment.

The surface temperatures of the heat receiving tiles were measured with an infrared radiation thermometer in a non-contact manner at the points shown in FIG. 5 on the middle two heat receiving tiles of the test sample. Five measurement points P1 to P5 were arranged in the center in a thickness direction of the heat receiving tile 10. Specifically, P1 was arranged at the center of the side surface that was at the same level as the cooling tube, P2 at the corner of the heat receiving surface, P3 in the center of the heat receiving surface, P4 at the opposite corner of P2 on the heat receiving surface, and P5 on the opposite side of P1 across the cooling tube.

Figure 6:
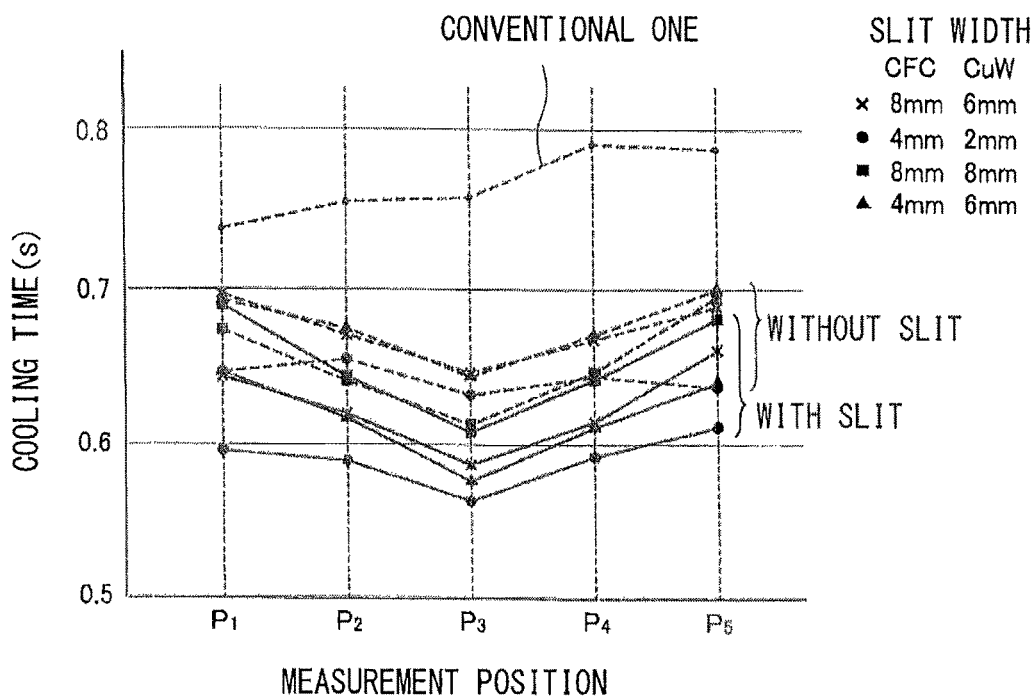
FIG. 6 is a graph illustrating the cooling speed compared by using the slit width as a parameter on the heat receiving tile of the present embodiment.

FIG. 6 is a graph illustrating the results of measurement of a cooling time, wherein the vertical axis represents the time taken for the temperature to fall from 90° C. to 60° C. (90° C.-60° C. cooling time) indicated in seconds and the horizontal axis represents the positions corresponding to the measurement points P1 to P5. In this graph of the cooling time, the values of each sample having the same combination of slit widths are plotted with the same symbol. The measurement points P1 to P5 are connected by a dotted line when with a brazing slit and by a solid line when without a brazing slit. The broken line shows the measurement result in the conventional one.

The measurement results show that the 90° C.-60° C. cooling time measured in the center of the heat receiving surface of the heat receiving tile of this embodiment is greatly shortened as compared with the conventional one: the 90° C.-60° C. cooling time is in the range between 0.65 and 0.56 seconds for the heat receiving tile of this embodiment, whereas it is about 0.75 seconds for the conventional one.

This results comes from less defects occurring in the heat receiving tile of this embodiment.

It is also shown that a cooling time is generally shorter when the slits of the heat receiving tile and the material of interlayer are narrower. This could be due to the fact that the air area is smaller and the heat transfer area is larger when the slits are narrower.

The cooling time of the sample having a brazing slit, indicated by a solid line in the graph, tends to be shorter than that of the sample without a brazing slit which has been brazed with the slit of the material of interlayer covered with the thin film type of brazing filler metal, which is indicated by a dotted line. Note that, the heat receiving tile with a brazing slit has a smaller variation in the cooling time (not shown in FIG. 6). From this, it is assumed that less defects, which tend to prevent heat transfer, occurred.

Figure 7:
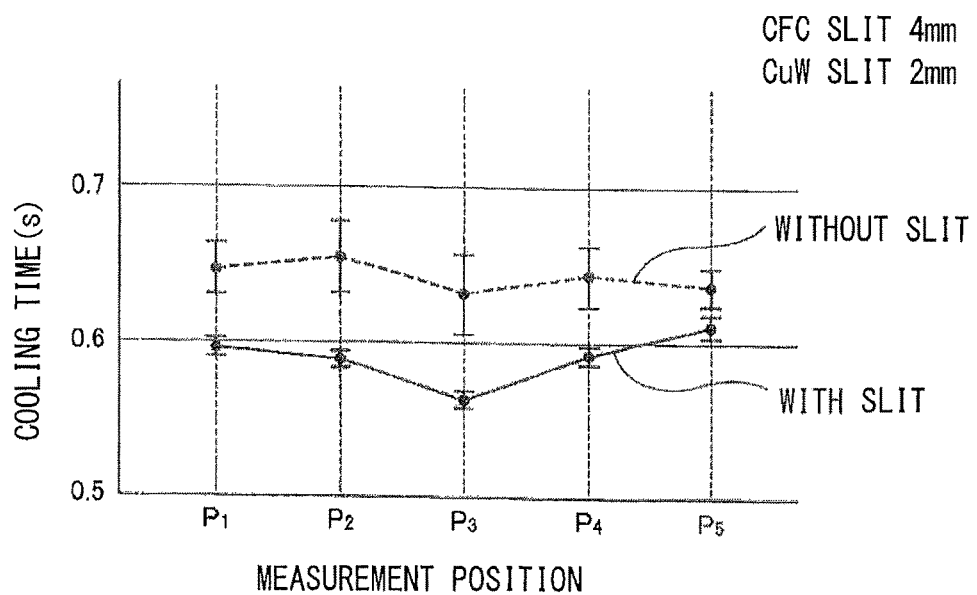
FIG. 7 is a graph illustrating the measurement result of the advantageous effect when the thin film type of brazing filler metal is void at the position of the slit according to the heat receiving tile of the present embodiment.
Figure 8:
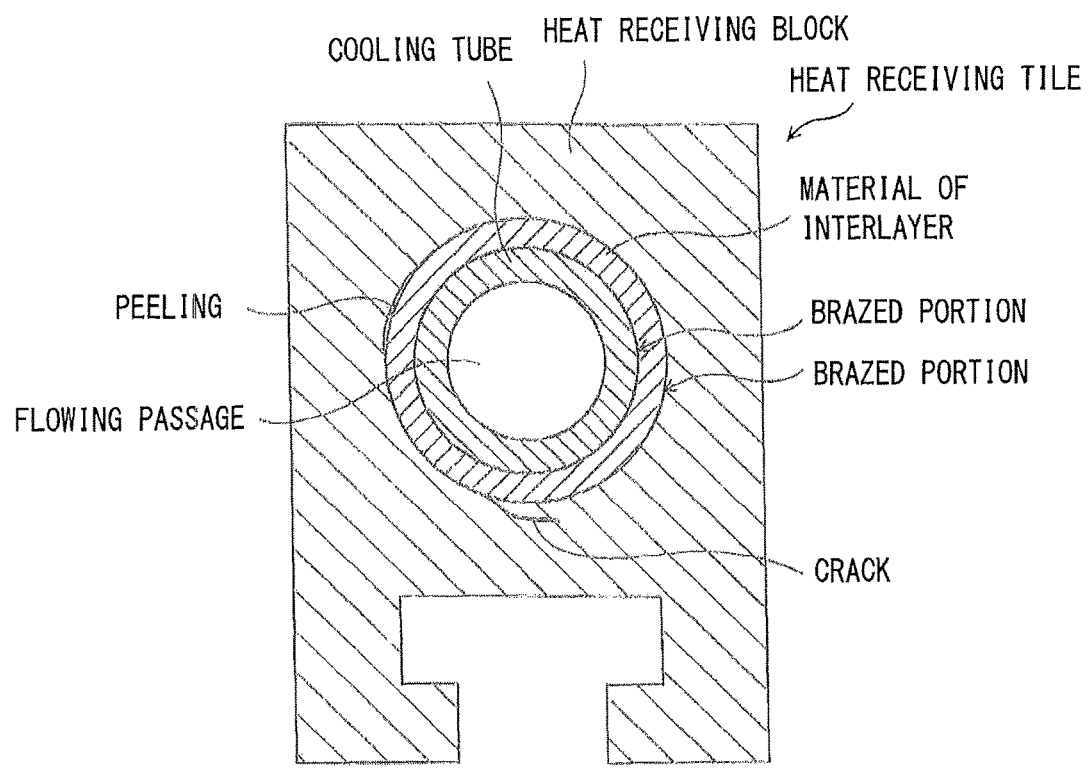
FIG. 8 is a sectional view illustrating the problem of the conventional heat receiving tile.

FIG. 7 is a graph, showing the cooling time of the samples having the narrowest slit on the material of interlayer and high heat removal performance (the slit of the material of interlayer is 2 mm wide and the slit of the heat receiving block is 4 mm wide), wherein the 90° C.-60° C. cooling times are compared between the sample with a brazing slit and the sample without a brazing slit. The error bars on each measurement point indicated in the graph represent the standard deviation of the measurement values obtained for the two heat receiving tiles.

The above-mentioned measurement results of the cooling time clearly show that the cooling time is shorter and the heat removal performance is higher for the sample with a brazing slit than those for the sample without a brazing slit.

The formation of a thin film type of brazing filler metal extending over the slit of the material of interlayer suppresses the free deformation of the material of interlayer until the temperature exceeds its melting point and the brazing filler metal melts. As a result, the brazed brazing layer and its neighboring area may be affected by something that prevents heat transfer.

As mentioned above, we found that the heat receiving tile of this embodiment has higher cooling performance compared with the conventional heat receiving tile. In addition, it is more effective when the slit provided in the material of interlayer is narrower. Moreover, the cooling performance is higher when the thin film type of brazing filler metal is inserted between the material of interlayer and the heat receiving block before the brazing process in such a manner that the thin film type of brazing filler metal does not extend over the slit of the material of interlayer so as not to suppress the deformation of the material of interlayer.

Note that, the slit width was controlled within a range of from 2 to 8 mm in the performance confirmation test for the convenience of machining. However, no matter how small in width the slit is, the material of interlayer merely needs to be opened by the slit to form a open-ring shape so as not to form a closed ring shape. This is because the slit is provided just for suppressing the thermal stress caused by the difference in the coefficient of thermal expansion. It is preferable, however, that the opposing walls of the slit would not collide with each other when the cooling tube contracts in its outer shape. Therefore, assuming that there is a temperature difference of 1000° C., the slit is preferably set to at least approximately 1.0 mm wide to prevent the walls of the slit facing each other from colliding with each other.

Additionally, a heat receiving tile with higher cooling performance than the conventional one can be obtained even when the slit is relatively wide. However, the slit wider than the diameter of the cooling tube is not advantageous for improving the cooling performance. Therefore, an upper limit of the slit width may be the outer diameter of the cooling tube.

INDUSTRIAL APPLICABILITY

The heat receiving tile formed by metallurgically joining a carbon material and a copper alloy according to the present invention, when used as a high heat load heat treatment member such as a divertor provided in a nuclear fusion reactor, exhibits higher cooling effect than the conventional one.

DESCRIPTION OF REFERENCE NUMERALS

10 Heat receiving tile
11 Heat receiving block
12 Through hole
13 First thin film type of brazing filler metal
14 Material of interlayer
15 Second thin film type of brazing filler metal
16 Cooling tube
18 Coolant
20 Fitting groove
21 Slit
22 Joint
23 Slit
24 Joint
31 Cooling passage part
32 Cooling water pipe
33 Connector for cooling pipe
34 Connector for cooling pipe

The invention claimed is:

1. A method of manufacturing a heat receiving tile formed of a carbon fiber composite material used for a high heat flux component, comprising the steps of:
disposing a first thin film type of brazing filler metal on an inner peripheral surface of a through hole of a heat receiving block which has a slit on a back of its heat receiving face;
disposing a cylindrical material of interlayer, which has a single slit, inside of the first thin film type of brazing filler metal while placing the slit of the cylindrical material of interlayer at a same position as a slit of the heat receiving block;
disposing a second thin film type of brazing filler metal on an inner peripheral surface of the material of interlayer;
disposing a cooling tube inside of the second thin film type of brazing filler metal, so as to prepare an assembly thereof; and
subjecting the assembly to a vacuum brazing process and further to an aging process.

2. The method of manufacturing the heat receiving tile formed of a carbon fiber composite material according to claim 1, wherein the first thin film type of brazing filler metal is disposed so as to be discontinuous at the slit of the material of interlayer prior to brazing.

3. The method of manufacturing the heat receiving tile formed of a carbon fiber composite material according to claim 1, wherein a titanium thin layer is formed on an inner wall of the through hole.

4. The method of manufacturing the heat receiving tile formed of a carbon fiber composite material according to claim 1, wherein the high heat flux component is a first wall provided in a nuclear fusion reactor.

5. A heat receiving tile formed of a carbon fiber composite material used for a high heat flux component comprising:
a heat receiving block formed of a carbon material and provided with a through hole;
a cooling tube formed of a copper alloy and fitted in the through hole;
a cylindrical material of interlayer disposed between the heat receiving block and the cooling tube;
brazing layers inserted between the material of interlayer and the heat receiving block and between the material of interlayer and the cooling tube; and
a slit formed over a thickness of the heat receiving block and passing through the heat receiving block and the material of interlayer so as to reach the cooling tube.

6. The heat receiving tile formed of a carbon fiber composite material according to claim 5, wherein a titanium carbide layer is formed on an inner wall of the through hole.

7. The heat receiving tile formed of a carbon fiber composite material according to claim 5, wherein the high heat flux component is a first wall provided in a nuclear fusion reactor.

8. The method of manufacturing the heat receiving tile formed of a carbon fiber composite material according to claim 2, wherein a titanium thin layer is formed on an inner wall of the through hole.

9. The method of manufacturing the heat receiving tile formed of a carbon fiber composite material according to claim 2, wherein the high heat flux component is a first wall provided in a nuclear fusion reactor.

10. The method of manufacturing the heat receiving tile formed of a carbon fiber composite material according to claim 3, wherein the high heat flux component is a first wall provided in a nuclear fusion reactor.

11. The method of manufacturing the heat receiving tile formed of a carbon fiber composite material according to claim 8, wherein the high heat flux component is a first wall provided in a nuclear fusion reactor.

12. The heat receiving tile formed of a carbon fiber composite material according to claim 6, wherein the high heat flux component is a first wall provided in a nuclear fusion reactor.

* * * * *